(12) United States Patent
Nishizawa et al.

(10) Patent No.: US 11,346,263 B2
(45) Date of Patent: May 31, 2022

(54) DPF REGENERATION CONTROL DEVICE AND DPF REGENERATION CONTROL METHOD

(71) Applicant: MITSUBISHI HEAVY INDUSTRIES ENGINE & TURBOCHARGER, LTD., Sagamihara (JP)

(72) Inventors: Kazuki Nishizawa, Tokyo (JP); Daisuke Sato, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/269,410

(22) PCT Filed: Aug. 14, 2019

(86) PCT No.: PCT/JP2019/031900
§ 371 (c)(1),
(2) Date: Feb. 18, 2021

(87) PCT Pub. No.: WO2020/045091
PCT Pub. Date: Mar. 5, 2020

(65) Prior Publication Data
US 2021/0254524 A1 Aug. 19, 2021

(30) Foreign Application Priority Data
Aug. 31, 2018 (JP) .............................. JP2018-162768

(51) Int. Cl.
*F01N 3/023* (2006.01)
*F01N 3/10* (2006.01)
(Continued)

(52) U.S. Cl.
CPC ............ *F01N 3/0235* (2013.01); *F01N 3/106* (2013.01); *F01N 9/002* (2013.01); *F01N 13/009* (2014.06);
(Continued)

(58) Field of Classification Search
CPC ...... F01N 3/0235; F01N 13/009; F01N 9/002; F01N 3/106; F01N 2430/10;
(Continued)

(56) References Cited

U.S. PATENT DOCUMENTS

2005/0044845 A1  3/2005  Onodera et al.
2006/0225409 A1  10/2006  Kuboshima et al.
(Continued)

FOREIGN PATENT DOCUMENTS

DE  11 2012 000 088 T5   8/2013
EP      2 322 776 B1     12/2011
(Continued)

OTHER PUBLICATIONS

Machine Translation of JP-2011069323-A (Year: 2011).*
(Continued)

*Primary Examiner* — Brandon D Lee
(74) *Attorney, Agent, or Firm* — Birch, Stewart, Kolasch & Birch, LLP.

(57) ABSTRACT

An ECU 10 includes a valve control unit 101 for throttling a valve opening of at least one of an intake throttle valve or an exhaust throttle valve so that an upstream temperature of a DOC reaches a predetermined temperature; and a deposition condition determination unit 105 for determining whether a deposition condition that a SOF deposition amount on the DOC exceeds a predetermined deposition amount is satisfied. The valve control unit 101 includes a throttle amount decrease control execution unit 102 for executing throttle amount decrease control to decrease a
(Continued)

throttle amount of the valve opening when the deposition condition is satisfied to be smaller than when the deposition condition is not satisfied.

7 Claims, 5 Drawing Sheets

(51) Int. Cl.
 *F01N 13/00* (2010.01)
 *F01N 9/00* (2006.01)
 *F02D 41/02* (2006.01)
(52) U.S. Cl.
 CPC ...... *F01N 2260/04* (2013.01); *F01N 2430/10* (2013.01); *F02D 41/029* (2013.01)
(58) Field of Classification Search
 CPC ............. F01N 2260/04; F01N 2430/06; F01N 2610/03; F01N 3/0253; F01N 2590/08; F01N 2900/1626; F01N 3/103; F01N 3/021; F01N 3/033; F01N 3/025; F02D 41/029; F02D 41/405; F02D 41/027; F02D 9/04; F02D 41/0002; Y02T 10/40
 See application file for complete search history.

(56) References Cited

U.S. PATENT DOCUMENTS

| 2014/0116247 A1 | 5/2014 | Nakazato et al. |
| 2016/0222900 A1* | 8/2016 | Nishizawa ............ F02D 41/024 |
| 2020/0173386 A1* | 6/2020 | Kiuchi ................... F01N 3/033 |

FOREIGN PATENT DOCUMENTS

| EP | 2 918 801 A1 | 9/2015 |
| EP | 2 987 974 A1 | 2/2016 |
| EP | 3 222 832 A1 | 9/2017 |
| JP | 2005-76604 A | 3/2005 |
| JP | 2006-291788 A | 10/2006 |
| JP | 2009-174513 A | 8/2009 |
| JP | 2010-144525 A | 7/2010 |
| JP | 2011-69323 A | 4/2011 |
| JP | 2011069323 A * | 4/2011 |
| JP | 2011-106340 A | 6/2011 |
| JP | 2014-218982 A | 11/2014 |
| JP | 2015-68233 A | 4/2015 |
| JP | 5720229 B2 | 5/2015 |
| JP | 2016-223367 A | 12/2016 |
| JP | 2018-44471 A | 3/2018 |

OTHER PUBLICATIONS

International Preliminary Report on Patentability and Written Opinion of the International Searching Authority for International Application No. PCT/JP2019/031900, dated Mar. 11, 2021, with an English translation.
International Search Report for International Application No. PCT/JP2019/031900, dated Nov. 5, 2019.
Extended European Search Report dated Mar. 22, 2021 issued to the corresponding European Application No. 19856263.9.
Office Action dated Mar. 15, 2022 issued in counterpart Japanese Application No. 2018-162768 with an English Translation.

* cited by examiner

DPF REGENERATION CONTROL DEVICE AND DPF REGENERATION CONTROL METHOD

BACKGROUND

A diesel engine is equipped with a diesel particulate filter (DPF) system as a post-treatment device to collect and remove particulate matters (PM) in exhaust gas. In the DPF system, a diesel oxidation catalyst (DOC) is arranged on the upstream side, and a DPF is arranged on the downstream side of the exhaust gas flow of the diesel engine. The PM collected by the DPF is removed by forced regeneration through the heating of the DPF when the PM reaches a predetermined amount or at regular intervals. The forced regeneration of the DPF includes automatic regeneration and manual regeneration.

In the forced regeneration, when a threshold for starting the DPF regeneration is reached, the exhaust gas temperature (exhaust temperature) is first raised to a temperature at which the DOC is active (about 250° C.). Thereafter, non-combusted fuel is supplied (late-post injection; LP injection), and oxidation heat is generated by the DOC, so that the exhaust temperature on the upstream side of the DPF rises to about 600° C., normally. The heating to the temperature at which the DOC is active (about 250° C.) is performed by throttling an intake throttle valve or an exhaust throttle valve, or changing the early-post injection amount and injection timing, etc. These controls are performed in accordance with a map according to the rotational speed of the diesel engine and the fuel injection amount. Further, these controls continue even after LP injection until the forced regeneration is completed.

One of techniques relating to the forced regeneration of the DPF is disclosed in Patent Document 1. Patent Document 1 discloses a temperature increase unit which performs opening control of a throttle valve disposed on the upstream side of a diesel engine (especially paragraph 0048).

CITATION LIST

Patent Literature

Patent Document 1: JP2015-68233

SUMMARY

Problems to be Solved

For example in a forklift, since there are many low-load operations with low exhaust temperature, soluble organic fraction (SOF) derived from fuel or lubricating oil is likely to be deposited on the DOC with the operating time. However, conventionally, the opening degree of the throttle valve is the same regardless of the amount of SOF deposited on the DOC. Therefore, if the SOF deposition amount is large, the heating to the temperature at which the DOC is active causes an abnormal temperature rise of a base material on the downstream side of the DOC due to heat generated by oxidation of the SOF. As a result, the DOC may be damaged, and the performance may decrease due to thermal deterioration of the catalyst.

At least one embodiment of the present invention was made in view of the above problems. An object thereof is to provide a DPF regeneration control device and a DPF regeneration control method whereby it is possible to suppress abnormal temperature rise of the DOC due to the DPF regeneration.

Solution to the Problems (1) A DPF regeneration control device according to at least one embodiment of the present invention is for controlling execution of forced regeneration that removes PM deposited on a DPF by increasing a temperature of the DPF in an exhaust gas treatment device of a diesel engine including a DOC disposed in an exhaust passage and the DPF disposed downstream of the DOC. The DPF regeneration control device includes: a valve control unit for throttling a valve opening of at least one of an intake throttle valve or an exhaust throttle valve so that an upstream temperature of the DOC reaches a predetermined temperature; and a deposition condition determination unit for determining whether a deposition condition that a SOF deposition amount on the DOC exceeds a predetermined deposition amount is satisfied. The valve control unit includes a throttle amount decrease control execution unit for executing throttle amount decrease control to decrease a throttle amount of the valve opening when the deposition condition is satisfied to be smaller than when the deposition condition is not satisfied.

With the above configuration (1), the valve opening throttle amount when the deposition condition is satisfied, i.e., when the SOF deposition amount on the DOC exceeds a predetermined deposition amount, is controlled to be smaller than when the deposition condition is not satisfied. In other words, the valve opening when the SOF deposition amount on the DOC is large is increased to be larger than the valve opening when the SOF deposition amount is small. Thus, even when the SOF deposition amount on the DOC is large, since the valve opening is increased, the exhaust gas flow rate inside the DOC is increased, and the contact time of the exhaust gas with the oxidation catalyst is reduced. As a result, abnormal temperature rise of the DOC can be suppressed by the reduction in SOF oxidation heat and the cooling effect due to the increased flow rate of the exhaust gas.

(2) In some embodiments, in the above configuration (1), the valve control unit further includes: a stop determination unit for determining whether a throttle amount decrease stop condition is satisfied after execution of the throttle amount decrease control; and a throttle amount decrease control stop unit for stopping the throttle amount decrease control when the throttle amount decrease stop condition is satisfied.

With the above configuration (2), when the throttle amount decrease stop condition indicating that the SOF deposition amount is sufficiently decreased is satisfied, the decrease in throttle amount of the valve opening is stopped. By stopping the decrease in throttle amount, the temperature can be increased quickly, so that the regeneration time can be shortened.

(3) In some embodiments, in the above configuration (2), the throttle amount decrease stop condition includes at least one of: a first throttle amount decrease stop condition that a temperature difference between an upstream temperature and a downstream temperature of the DOC is equal to or lower than a predetermined temperature; a second throttle amount decrease stop condition that a change rate of a temperature difference between an upstream temperature and a downstream temperature of the DOC is equal to or less than a predetermined rate; or a third throttle amount decrease stop condition that a heating amount in the DOC is equal to or less than a predetermined heating amount.

With the above configuration (3), the decrease in throttle amount of the valve opening is stopped after the heating amount due to oxidation of the SOF in the DOC is decreased. For example, according to the first throttle amount decrease stop condition based on the temperature difference, the determination can be made simply by measuring the upstream temperature and the downstream temperature of the DOC, so that the determination can be simplified. Further, for example, according to the second throttle amount decrease stop condition, even when the temperature difference between the upstream temperature and the downstream temperature of the DOC is increased momentarily, since the determination is based on the change rate of the temporal change in temperature difference, a stable determination can be made while excluding the momentary increase. Further, for example, according to the third throttle amount decrease stop condition, it can be directly determined whether heat is generated due to oxidation of the SOF in the DOC.

(4) In some embodiments, in any one of the above configurations (1) to (3), the deposition condition determination unit is configured to determine whether the deposition condition is satisfied, based on a SOF deposition index obtained by multiplying a weighting coefficient set according to the upstream temperature of the DOC by an operating time of the diesel engine.

With the above configuration (4), since the SOF deposition index considering the operating time of the diesel engine can be calculated, the SOF deposition amount can be accurately estimated. Thus, since the decrease in throttle amount can be stopped based on the appropriate SOF deposition amount, the throttle amount decrease control can be performed at high accuracy.

(5) In some embodiments, in the above configuration (4), with a reference temperature on an upstream side of the DOC as a boundary, the weighting coefficient includes a negative weighting coefficient when the upstream temperature is higher than the reference temperature, and the weighting coefficient includes a positive weighting coefficient when the upstream temperature is lower than the reference temperature.

With the above configuration (5), when the SOF is likely to volatilize since the upstream temperature of the DOC is higher than the reference temperature, the SOF deposition amount can be evaluated in consideration of a decrease in SOF caused by the volatilization. Thus, since the decrease in throttle amount can be stopped based on the appropriate SOF deposition amount, the throttle amount decrease control can be performed at high accuracy.

(6) In some embodiments, in any one of the above configurations (1) to (5), the valve control unit is configured to control the valve opening so that a throttle amount decrease amount increases as the SOF deposition amount on the DOC increases.

With the above configuration (6), the exhaust gas flow rate increases as the SOF deposition amount increases. Thus, even when the heating amount is increased due to the large SOF deposition amount, the contact time of the exhaust gas with the oxidation catalyst can be reduced by the increased flow rate of the exhaust gas. As a result, abnormal temperature rise of the DOC can be suppressed by the reduction in oxidation heat and the cooling effect due to the increased flow rate of the exhaust gas.

(7) A DPF regeneration control method according to at least one embodiment of the present invention is for controlling execution of forced regeneration that removes PM deposited on a DPF by increasing a temperature of the DPF in an exhaust gas treatment device of a diesel engine including a DOC disposed in an exhaust passage and the DPF disposed downstream of the DOC. The DPF regeneration control method includes: a valve control step of throttling a valve opening of at least one of an intake throttle valve or an exhaust throttle valve so that an upstream temperature of the DOC reaches a predetermined temperature; and a deposition condition determination step of determining whether a deposition condition that a SOF deposition amount on the DOC exceeds a predetermined deposition amount is satisfied. The valve control step includes a throttle amount decrease control execution step of executing throttle amount decrease control to decrease a throttle amount of the valve opening when the deposition condition is satisfied to be smaller than when the deposition condition is not satisfied.

With the above configuration (7), the valve opening throttle amount when the deposition condition is satisfied, i.e., when the SOF deposition amount on the DOC exceeds a predetermined deposition amount, is controlled to be smaller than when the deposition condition is not satisfied. In other words, the valve opening when the SOF deposition amount on the DOC is large is increased to be larger than the valve opening when the SOF deposition amount on the DOC is small. Thus, even when the SOF deposition amount on the DOC is large, since the valve opening is increased, the exhaust gas flow rate inside the DOC is increased, and the contact time of the exhaust gas with the oxidation catalyst is reduced. As a result, abnormal temperature rise of the DOC can be suppressed by the reduction in SOF oxidation heat and the cooling effect due to the increased flow rate of the exhaust gas.

Advantageous Effects

At least one embodiment of the present invention provides a DPF regeneration control device and a DPF regeneration control method whereby it is possible to suppress abnormal temperature rise of the DOC due to the DPF regeneration.

DETAILED DESCRIPTION

Figure 1:
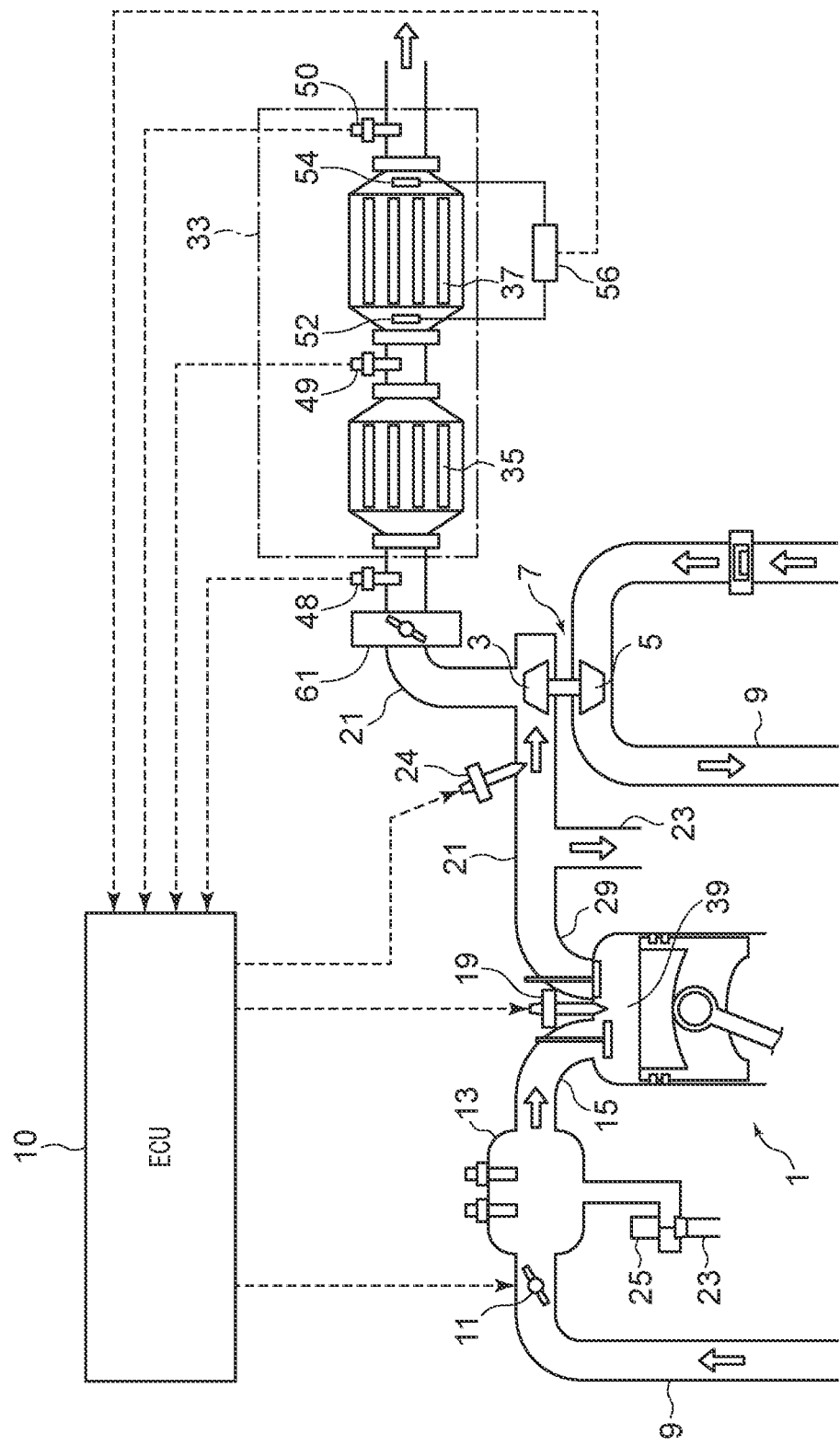
FIG. 1 is an overall configuration diagram of an exhaust gas treatment device of a diesel engine according to an embodiment of the present invention.

Embodiments of the present invention will now be described in detail with reference to the accompanying drawings. However, the following embodiments and the drawings are illustrative only, and various modifications may be applied as long as they do not depart from the object of the present invention. Further, two or more embodiments may be optionally combined in any manner. Further, in the following embodiments, similar elements will be indicated by the same reference numerals, and redundant descriptions thereof will be omitted for convenience.

It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIG. 1 is an overall configuration diagram of an exhaust gas treatment device of a diesel engine 1 according to an embodiment of the present invention. The exhaust gas treatment device shown in FIG. 1 is an exhaust gas treatment device of a diesel engine 1 including a DOC 35 disposed in an exhaust passage 21 and a DPF 37 disposed downstream of the DOC 35.

The downstream side of the diesel engine 1 is connected to an exhaust passage 21. The exhaust passage 21 is provided with an exhaust gas treatment device 33 including a DOC 35 and a DPF 37 disposed downstream of the DOC 35. The DOC 35 has a function of oxidizing and removing non-combusted fuel (HC) and carbon monoxide (CO) in exhaust gas, and oxidizing nitrogen monoxide (NO) in exhaust gas to produce nitrogen dioxide ($NO_2$). Further, in the DOC 35, exhaust gas passing therethrough is heated by oxidation heat of injected fuel, so that the upstream temperature (e.g., inlet temperature) of the DPF 37 increases. The DPF 37 is a device for collecting the PM such as soot contained in exhaust gas with a filter to remove the PM from the exhaust gas.

The upstream side of the diesel engine 1 is connected to an intake passage 9 via an intake manifold 13. Between the intake passage 9 and the exhaust passage 21, an exhaust turbocharger 7 is disposed. The exhaust turbocharger 7 includes an exhaust turbine 3 disposed in the exhaust passage 21 and a compressor 5 disposed in the intake passage 9. The compressor 5 is coaxially driven by the exhaust turbine 3. Further, an inter cooler (not shown) and an intake throttle valve 11 are disposed in the intake passage 9. The opening degree of the intake throttle valve 11 is controlled by an ECU 10, which will be described later. After the inter cooler cools the compressed intake air discharged from the compressor 5, the intake throttle valve 11 controls the intake air flow rate, and the compressed intake air flows into a combustion chamber 39 of each cylinder of the diesel engine 1 through an intake port 15.

The diesel engine 1 has a fuel injection valve 19 for injecting high-pressure fuel to the combustion chamber 39.

The fuel injection valve 19 is connected to a common rail (not shown) in which the high-pressure fuel accumulates, and the ECU 10 described later controls the injection timing and the fuel injection amount thereof. The high-pressure fuel injected into the combustion chamber 39 is mixed with the above-described intake air, and is then combusted in the combustion chamber 39.

At a position immediately downstream of the exhaust port 29 of the exhaust passage 21, an EGR pipe 23 branches from the exhaust passage 21. The EGR pipe 23 is connected to the intake manifold 13 disposed downstream of the intake throttle valve 11. Further, an EGR valve 25 is disposed in the EGR pipe 23. By controlling the EGR valve 25, a part of exhaust gas discharged from the diesel engine 1 passes through the EGR pipe 23 and recirculates through the diesel engine 1.

The exhaust gas discharged from the diesel engine 1 drives the exhaust turbine 3 and coaxially drives the compressor 5. Then, after passing through the exhaust passage 21, the exhaust gas flows into the DOC 35 and the DPF 37 of the exhaust gas treatment device 33. The exhaust passage 21 has an exhaust throttle valve 61.

When the exhaust gas flows into the exhaust gas treatment device 33, non-combusted fuel and carbon monoxide in the exhaust gas are oxidized and removed by the DOC 35. Then, the PM contained in the exhaust gas is removed by the DPF 37, and the exhaust gas from which the PM has been removed is discharged to the outside of the engine.

A part of the PM removed by the DPF 37 is regenerated by $NO_2$ produced by oxidizing NO in the exhaust gas of the engine during operation with the DOC 35 (natural regeneration), while the remainder of the PM deposits on a filter (not shown) of the DPF 37. If the PM deposition progresses excessively, the PM collecting capacity may decrease, and the engine output may decrease due to an increase in back pressure. Therefore, in the exhaust gas treatment device 33 including the DPF 37, forced regeneration that regenerates the filter by forcibly combusting the deposited PM is executed at an appropriate timing.

The forced regeneration includes at least two types of regeneration: automatic regeneration executed by the ECU 10 automatically; and manual regeneration executed manually by an operator, for example. The automatic regeneration is automatically executed if predetermined forced regeneration execution conditions are satisfied, regardless of whether the vehicle (not shown) is moving or stopped. Meanwhile, the manual regeneration is executed by, for instance, button operation of an operator, basically while the vehicle is stopped. Thus, the regeneration temperature of the manual regeneration is controlled to be higher than that of the automatic regeneration. For example, the upstream temperature of the DPF 37 is controlled to be 600° C. to 610° C. in the automatic regeneration, while the same is controlled to be 620° C. to 630° C. in the manual regeneration.

The temperature rise control can be performed by adjusting the opening degree of the exhaust throttle valve 61. Specifically, the exhaust temperature can be increased by throttling the exhaust throttle valve 61 (decreasing the opening degree). The temperature rise control can be performed by, in addition to or instead of the opening adjustment of the exhaust throttle valve 61, the opening adjustment of the intake throttle valve 11.

The exhaust passage 21 is provided with various sensors such as a DOC upstream temperature sensor 48, a DPF upstream temperature sensor 49, a DPF downstream temperature (e.g., outlet temperature) sensor 50, a DPF upstream pressure sensor 52, a DPF downstream pressure sensor 54, a DPF differential pressure sensor 56, and a back pressure sensor (not shown). Signals relating to the DOC inlet temperature, DPF inlet temperature, DPF outlet temperature, DPF differential pressure, etc., measured by these sensors are input to the ECU 10.

The ECU 10 includes a CPU (Central Processing Unit), a ROM (Read Only Memory, for example, EEPROM, Flash ROM, etc.), a RAM (Random Access Memory), an I/F (Interface), although not depicted. The ECU 10 is implemented by executing a predetermined control program stored in the ROM with the CPU.

Figure 2:
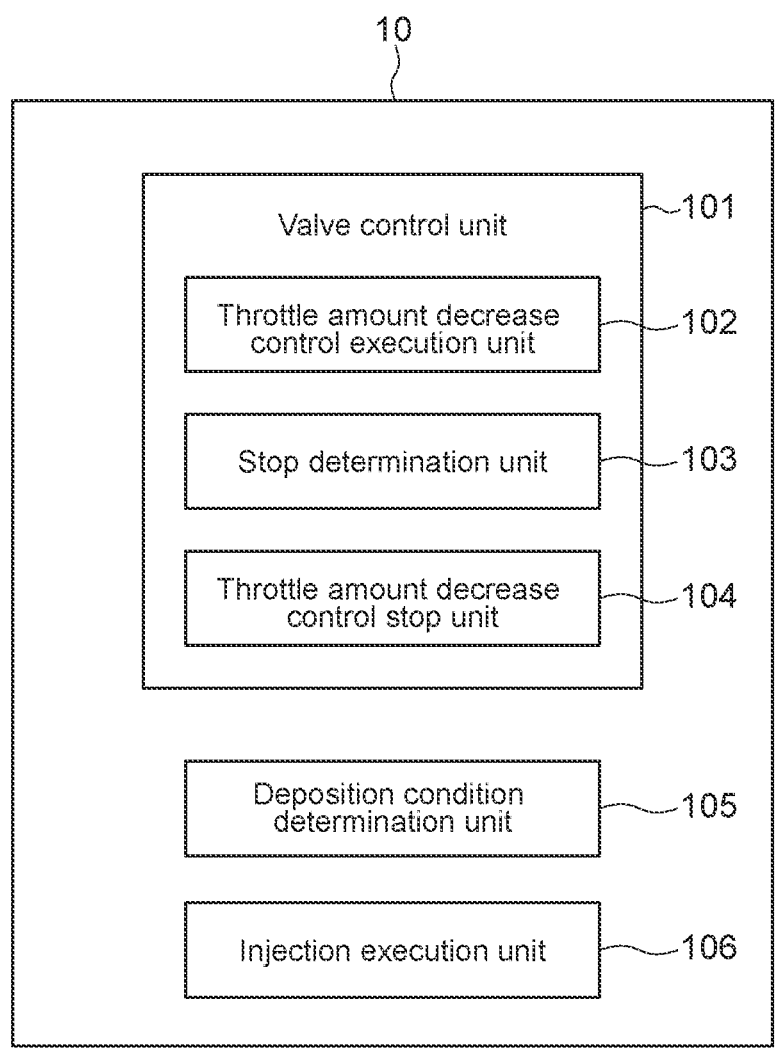
FIG. 2 is a block diagram for describing a function of an ECU.

FIG. 2 is a block diagram for describing a function of the ECU 10. The ECU 10 (DPF regeneration control device) is for controlling execution of forced regeneration that removes the PM deposited on the DPF 37 by increasing the temperature of the DPF 37. The ECU 10 includes a valve control unit 101, a deposition condition determination unit 105, and an injection execution unit 106. Among them, the valve control unit 101 includes a throttle amount decrease control execution unit 102, a stop determination unit 103, and a throttle amount decrease control stop unit 104.

The valve control unit 101 is for throttling the valve opening of at least one of an intake throttle valve 11 (see FIG. 1) or an exhaust throttle valve 61 (see FIG. 1) so that the upstream temperature of the DOC 35 reaches a predetermined temperature. When the valve opening is throttled, the exhaust temperature to the DOC 35 rises.

In an embodiment of the present invention, the valve control unit 101 is configured to control the valve opening so that the throttle amount decrease amount increases as the SOF deposition amount on the DOC 35 increases. Thus, since the exhaust gas flow rate in the DOC increases as the SOF deposition amount increases, it is possible to suppress abnormal temperature rise of the DOC 35 due to heat caused by oxidation of the SOF.

The deposition condition determination unit 105 is for determining whether a deposition condition that the SOF deposition amount on the DOC 35 exceeds a predetermined deposition amount is satisfied. Further, the injection execution unit 106, which will be described later, is configured to, when the deposition condition is satisfied, start the late-post injection in the state where the throttle amount of the valve opening is decreased, as described later in detail. Thus, in an embodiment of the present invention, only when the SOF deposition amount on the DOC 35 is large (when it exceeds a predetermined amount), the throttle amount of the valve opening is decreased.

The SOF deposition amount on the DOC 35 constituting the deposition condition may be directly calculated, or in an embodiment of the present invention, may be estimated as follows. Specifically, for example, the deposition condition determination unit 105 can evaluate that the SOF deposition amount is large when a continuous time during which the upstream temperature of the DOC 35 is equal to or lower than a predetermined temperature is equal to or longer than a predetermined time. Alternatively, for example, the deposition condition determination unit 105 can evaluate that the SOF deposition amount is large when the proportion of time when the diesel engine 1 is under low-load operation (torque or fuel injection amount is equal to or less than a predetermined value) or the proportion of time when the exhaust temperature is equal to lower than a predetermined temperature is equal to or more than a predetermined value.

Further, the deposition condition determination unit 105 may be configured to determine whether the deposition condition is satisfied, based on a SOF deposition index obtained by multiplying a weighting coefficient set according to the upstream temperature of the DOC 35 by the operating time (e.g., cumulative operating time or the last certain operating time) of the diesel engine 1. With this configuration, since the SOF deposition index considering the operating time of the diesel engine 1 can be calculated, the SOF deposition amount can be accurately estimated. The weighting coefficient can be determined, for example, based on a map relating to correlation between the upstream temperature of the DOC 35 and the weighting coefficient stored in the ECU 10.

For example, the higher the upstream temperature of the DOC 35, the smaller the weighting coefficient can be set. Particularly, in an embodiment of the present invention, with a reference temperature on the upstream side of the DOC 35 as a boundary, the weighting coefficient includes a negative weighting coefficient when the upstream temperature is higher than the reference temperature, and includes a positive weighting coefficient when lower than the reference temperature. With this configuration, when the SOF is likely to volatilize since the upstream temperature of the DOC 35 is higher than the reference temperature, the SOF deposition amount can be evaluated in consideration of a decrease in SOF caused by the volatilization.

The injection execution unit 106 is for executing the late-post injection of fuel into the DOC 35 when the upstream temperature of the DOC 35 reaches a predetermined temperature (e.g., 250° C.) after the start of the forced regeneration of the DPF 37. The late-post injection triggers the SOF oxidation heating on the DOC 35, which increases the downstream temperature of the DOC 35, i.e., the upstream temperature of the DPF 37. As a result, soot deposited on the DPF 37 is combusted and removed.

As described above, the valve control unit 101 includes the throttle amount decrease control execution unit 102, the stop determination unit 103, and the throttle amount decrease control stop unit 104.

Among them, the throttle amount decrease control execution unit 102 is for executing throttle amount decrease control to decrease the throttle amount of the valve opening when the deposition condition is satisfied to be smaller than when the deposition condition is not satisfied. Thus, when the deposition condition is satisfied (when the SOF deposition amount on the DOC 35 is large), in an embodiment of the present invention, the throttle amount of the valve opening is decreased. As a result, the exhaust gas flow rate to the DOC increases compared with the case where the SOF deposition amount is small. Consequently, the oxidation heat reaction due to an increase in exhaust gas flow rate is suppressed, and the temperature rise due to heat removing is suppressed, so that it is possible to suppress excessive temperature rise of the DOC 35.

The throttle amount of the valve opening can be controlled in accordance with the remaining SOF deposition amount on the DOC 35. This point will now be described with reference to FIG. 3.

Figure 3:
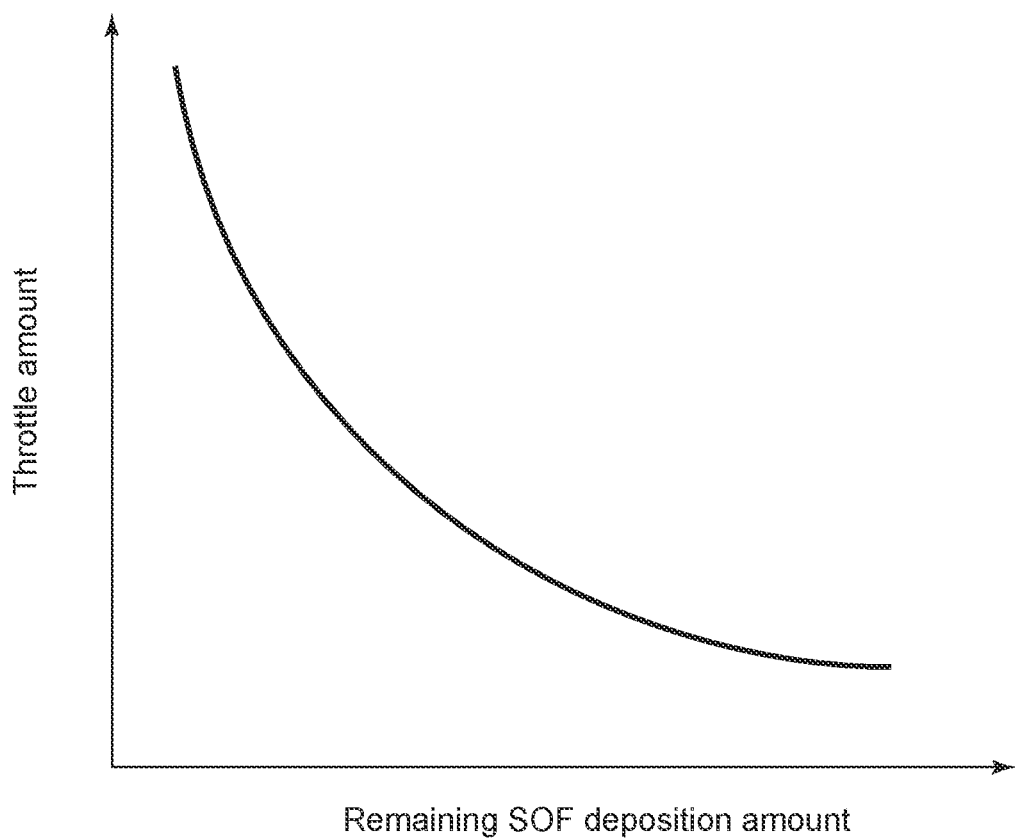
FIG. 3 is a graph showing a correlation between the remaining SOF deposition amount and the throttle amount.

FIG. 3 is a graph showing a correlation between the remaining SOF deposition amount and the throttle amount. This graph is schematically shown for explaining the correlation between the remaining SOF deposition amount and the throttle amount, and the actual graph does not always match the graph shown in FIG. 3. As shown in FIG. 3, when the remaining SOF deposition amount decreases due to temperature rise of the DOC 35, the valve opening throttle amount decreases. That is, the smaller the remaining SOF deposition amount, the smaller the valve opening throttle amount and the smaller the throttle decrease amount.

Thus, when the remaining SOF deposition amount on the DOC 35 is small and the possibility of overheating of the DOC 35 is low, the throttle amount can be set as usual (for example, it may be set to the valve opening throttle amount when the deposition condition is not satisfied). Therefore, for instance, by estimating the remaining SOF deposition amount based on the exhaust gas flow rate or the temperature difference between the upstream temperature and the downstream temperature of the DOC 35, and determining the throttle amount based on the correlation shown in FIG. 3, the valve opening can be adjusted according to the remaining SOF deposition amount.

Referring to FIG. 2 again, the stop determination unit 103 is for determining whether a throttle amount decrease stop condition is satisfied after execution of the throttle amount decrease control of the valve opening. In an embodiment of the present invention, the throttle amount decrease stop condition includes at least one of: a first throttle amount decrease stop condition that the temperature difference between the upstream temperature and the downstream temperature of the DOC 35 is equal to or lower than a first temperature; a second throttle amount decrease stop condition that the change rate of the temperature difference between the upstream temperature and the downstream temperature of the DOC 35 is equal to or less than a second rate; or a third throttle amount decrease stop condition that the heating amount in the DOC 35 is equal to or less than a third heating amount.

When the determination is based on such throttle amount decrease stop conditions, the decrease in throttle amount of the valve opening can be stopped after the heating amount due to oxidation of the SOF in the DOC 35 is decreased. For example, according to the first throttle amount decrease stop condition based on the temperature difference, the determination can be made simply by measuring the upstream temperature and the downstream temperature of the DOC 35, so that the determination can be simplified. Further, for example, according to the second throttle amount decrease stop condition, even when the temperature difference between the upstream temperature and the downstream temperature of the DOC 35 is increased momentarily, since the determination is based on the change rate of the temporal change in temperature difference, a stable determination can be made while excluding the momentary increase. Further, for example, according to the third throttle amount decrease stop condition, it can be directly determined whether heat is generated due to oxidation of the SOF in the DOC 35.

The throttle amount decrease control stop unit 104 is for stopping the throttle amount decrease control by the throttle amount decrease control execution unit 102 when the throttle amount decrease stop condition is satisfied. With the throttle amount decrease control stop unit 104, when the throttle amount decrease stop condition is satisfied, the decrease in throttle amount of the valve opening can be stopped. Further, since the throttle amount decrease control is stopped, the valve opening is reduced to the value when the SOF deposition condition is not satisfied. Accordingly, the exhaust gas flow rate in the DOC 35 is reduced.

With the ECU 10 (DPF regeneration control device) having the above configuration, the valve opening throttle amount when the deposition condition is satisfied, i.e., when the SOF deposition amount on the DOC 35 exceeds a predetermined deposition amount, is controlled to be smaller than when the deposition condition is not satisfied. In other words, the valve opening when the SOF deposition amount on the DOC 35 is large is increased to be larger than the valve opening when the SOF deposition amount is small.

Thus, even when the SOF deposition amount on the DOC 35 is large, since the valve opening is increased, the exhaust gas flow rate inside the DOC 35 is increased, and the contact time of the exhaust gas with the oxidation catalyst is reduced. As a result, abnormal temperature rise of the DOC 35 can be suppressed by the reduction in SOF oxidation heat and the cooling effect due to the increased flow rate of the exhaust gas.

Particularly, in regeneration after a long period of low-load operation in which a large amount of SOF is deposited on the DOC 35, abnormal temperature rise of the DOC 35 during the heating of the DOC 35 is suppressed. This reduces the risk of damage to the DOC 35 and damage to the DPF 37 due to abnormal combustion of soot in the DPF 37. As a result, it is possible to suppress thermal deterioration of the catalyst supported on the DOC 35. Further, since the thermal deterioration of the catalyst is suppressed, it is possible to maintain a predetermined exhaust gas treatment performance for a long time, and it is possible to reduce the deterioration of fuel consumption and the risk of oil dilution due to the increase in late-post fuel. Moreover, it is possible to reduce the amount of supported catalyst in the initial stage, and it is possible to reduce the cost.

Figure 4:
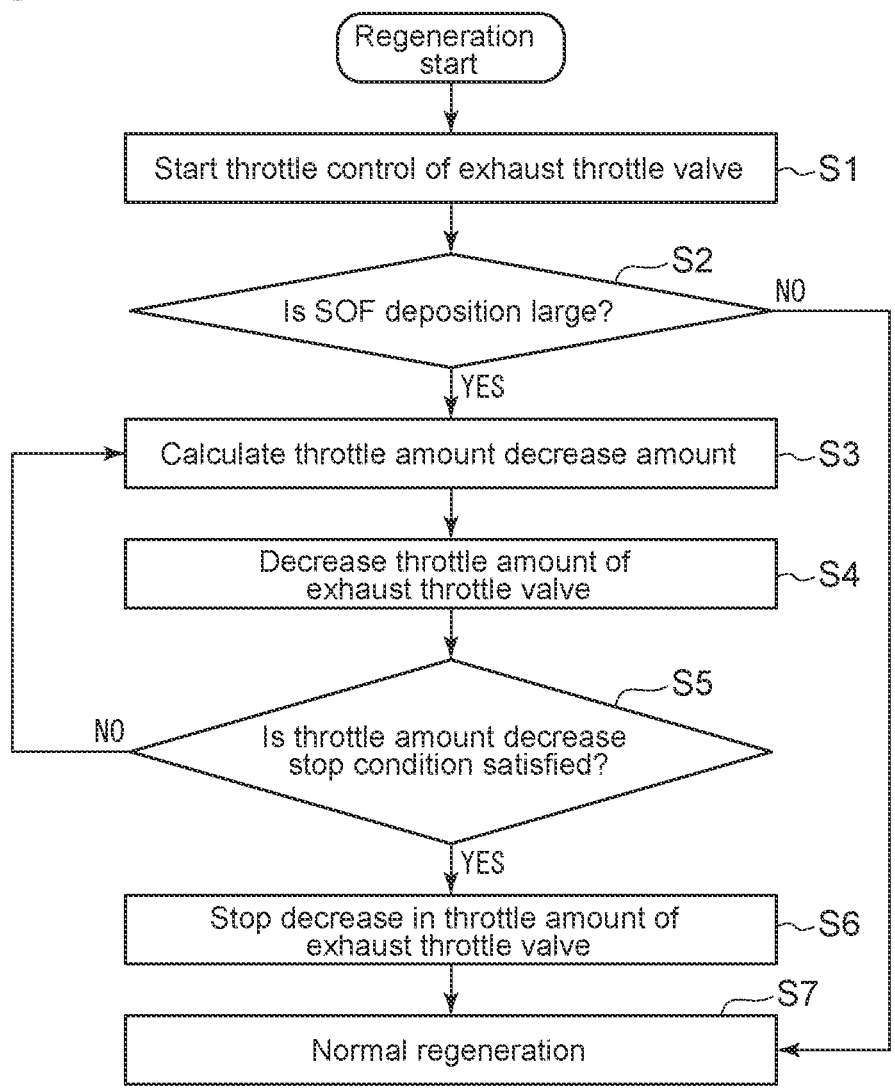
FIG. 4 is a flowchart executed by the ECU, and shows an exhaust gas treatment method of a diesel engine according to an embodiment of the present invention.

FIG. 4 is a flowchart executed by the ECU 10, and shows an exhaust gas treatment method of the diesel engine according to an embodiment of the present invention (hereinafter, simply referred to as "control method according to the present embodiment"). The control method according to the present embodiment is for controlling execution of forced regeneration that removes PM deposited on the DPF 37 by increasing the temperature of the DPF 37 in the exhaust gas treatment device of the diesel engine 1 including the DOC 35 disposed in the exhaust passage 21 and the DPF 37 disposed downstream of the DOC 35. Since the control method according to the present embodiment is executed by the ECU 10, it will be described with reference to FIG. 2 as appropriate.

When the forced regeneration is started, the valve control unit 101 throttles the valve opening of the exhaust throttle valve 61 so that the upstream temperature of the DOC 35 reaches a predetermined temperature (e.g., 250° C.) (step S1, valve control step). As a result, the exhaust temperature starts rising. The exhaust temperature may be raised by, for instance, limiting the valve opening of the intake throttle valve 11 in addition to the exhaust throttle valve 61 or instead of the exhaust throttle valve 61, or changing the early-post injection amount and injection timing, or changing the fuel injection rail pressure.

Then, the deposition condition determination unit 105 determines whether the deposition condition that the SOF deposition amount on the DOC 35 exceeds a predetermined deposition amount is satisfied (step S2, deposition condition determination step). The SOF deposition amount may be, for example, the same as described in the deposition condition determination unit 105. When the deposition condition is not satisfied (NO), oxidation heat generation of the SOF deposited on the DOC 35 is performed without the valve opening throttle amount control.

On the other hand, when the deposition condition is satisfied (YES), the throttle amount decrease control execution unit 102 calculates the throttle amount decrease amount of the valve opening (step S3). Specifically, the throttle amount decrease control execution unit 102 determines the throttle amount based on the correlation shown in FIG. 3, for example. Then, the throttle amount decrease control execution unit 102 decreases the throttle amount of the valve opening of the exhaust throttle valve 61 to the determined throttle amount (step S4, throttle amount decrease control execution step). By the step S4 (throttle amount decrease control execution step), the throttle amount decrease control is executed to decrease the throttle amount of the valve opening when the deposition condition is satisfied to be smaller than when the deposition condition is not satisfied. The throttle amount decrease control execution step is included in the valve opening control step.

Then, the stop determination unit 103 determines whether at least one of the following conditions is satisfied: the first throttle amount decrease stop condition that the temperature difference between the upstream temperature and the downstream temperature of the DOC 35 is equal to or lower than the first temperature; the second throttle amount decrease stop condition that the change rate of the temperature difference is equal to or less than the second rate; or the third throttle amount decrease stop condition that the heating amount in the DOC 35 is equal to or less than the third heating amount (step S5). If at least one of the throttle amount decrease stop conditions is satisfied, it is considered that the SOF deposition amount on the DOC 35 is sufficiently decreased. Therefore, when the stop determination unit 103 determines that the throttle amount decrease stop condition is satisfied (YES), the throttle amount decrease control stop unit 104 stops the decrease in throttle amount of the valve opening (step S6). When the decrease in throttle amount is stopped, the valve opening is reduced to the value when the SOF deposition condition is not satisfied. Accordingly, the exhaust gas flow rate in the DOC 35 is reduced. Then, normal regeneration of the DPF is performed by the late-post injection of non-combusted fuel by the injection execution unit 106 (step S7).

Meanwhile, in the step S5, when the stop determination unit 103 determines that none of the throttle amount decrease stop conditions is satisfied, the throttle amount decrease amount is calculated again in the step S3.

Figure 5:
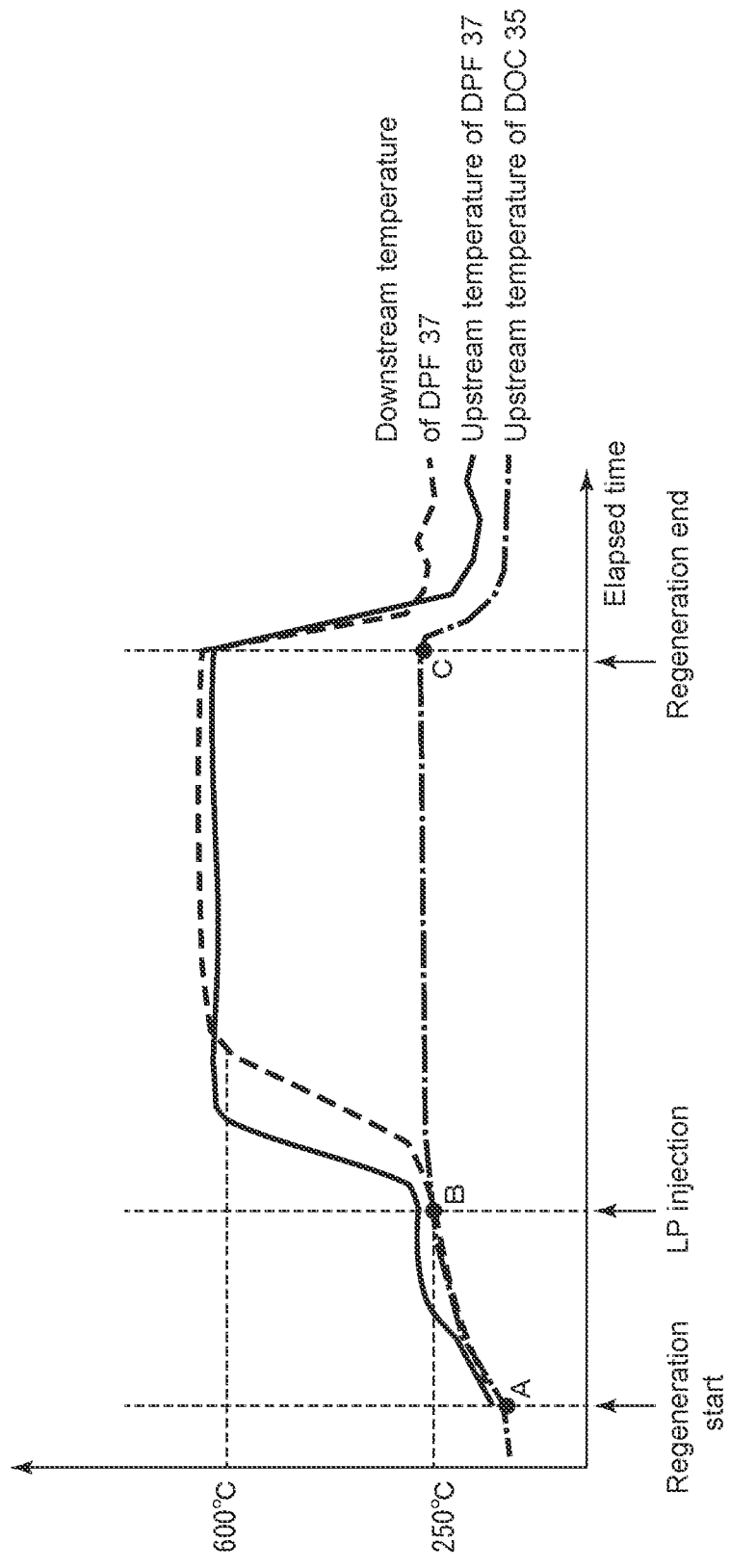
FIG. 5 is a graph showing temperature change over time.

FIG. 5 is a graph showing temperature change over time. The solid line represents the upstream temperature of the DPF 37, the dash-dotted line represents the upstream temperature of the DOC 35, and the dashed line represents the downstream temperature of the DPF 37. When the forced regeneration of the DPF 37 starts, the upstream temperature of the DOC 35 starts rising by the throttling of the opening of the exhaust throttle valve 61, for example (point A). Further, the SOF oxidation heat generation begins in the DOC 35, and the upstream temperature of the DPF 37 starts rising as shown by the solid line. However, since the opening throttle amount of the exhaust throttle valve 61 is decreased (i.e., the opening degree is increased) compared with the opening throttle amount when the SOF deposition is small, the exhaust gas flow rate in the DOC 35 is increased. Accordingly, the contact time of the exhaust gas with the oxidation catalyst is reduced. As a result, temperature rise of the DOC 35 is suppressed by the reduction in oxidation heat and the cooling effect due to the increased flow rate of the exhaust gas, so that the upstream temperature of the DPF 37 is suppressed from rising rapidly, and the upstream temperature of the DPF 37 gradually rises. Consequently, abnormal temperature rise of the DOC 35 and overshooting of the upstream temperature of the DPF 37 are suppressed.

Then, when the upstream temperature of the DOC 35 reaches 250° C. (predetermined temperature) (point B), the late-post injection of fuel is started. By the late-post injection, the injected fuel is oxidized and heated in the DOC 35, and the downstream temperature of the DOC 35, i.e., the upstream temperature of the DPF 37 rises sharply. Further, soot is combusted at the DPF 37, and the downstream temperature of the DPF 37 also rises. Then, after a sufficient time elapses from the start of the late-post injection, the forced regeneration is completed (point C), and the temperature drops.

With the control method according to the present embodiment, the valve opening throttle amount when the deposition condition is satisfied, i.e., when the SOF deposition amount on the DOC 35 exceeds a predetermined deposition amount, is controlled to be smaller than when the deposition condition is not satisfied. In other words, the valve opening when the SOF deposition amount on the DOC 35 is large is increased to be larger than the valve opening when the SOF deposition amount is small. Thus, even when the SOF deposition amount on the DOC 35 is large, since the valve opening is increased, the exhaust gas flow rate inside the DOC 35 is increased, and the contact time of the exhaust gas with the oxidation catalyst is reduced. As a result, abnormal temperature rise of the DOC 35 can be suppressed by the reduction in SOF oxidation heat and the cooling effect due to the increased flow rate of the exhaust gas.

Particularly, in regeneration after a long period of low-load operation in which a large amount of SOF is deposited on the DOC 35, abnormal temperature rise of the DOC 35 during the heating of the DOC 35 is suppressed. This reduces the risk of damage to the DOC 35 and damage to the DPF 37 due to abnormal combustion of soot in the DPF 37. As a result, it is possible to suppress thermal deterioration of the catalyst supported on the DOC 35. Further, since the thermal deterioration of the catalyst is suppressed, it is possible to maintain a predetermined exhaust gas treatment performance for a long time, and it is possible to reduce the deterioration of fuel consumption and the risk of oil dilution due to the increase in late-post fuel. Moreover, it is possible to reduce the amount of supported catalyst in the initial stage, and it is possible to reduce the cost.

REFERENCE SIGNS LIST

1 Diesel engine
5 Exhaust turbine
5 Compressor
7 Turbocharger
9 Intake passage
10 ECU
11 Intake throttle valve
13 Intake manifold
15 Intake port
19 Fuel injection valve
21 Exhaust passage
23 EGR pipe
25 Valve
29 Exhaust port
33 Exhaust gas treatment device
39 Combustion chamber
48, 49 Upstream temperature sensor
50 DPF downstream temperature sensor
52 Upstream pressure sensor
54 Downstream pressure sensor
56 Differential pressure sensor
61 Exhaust throttle valve
101 Valve control unit
102 Throttle amount decrease control execution unit
103 Stop determination unit
104 Throttle amount decrease control stop unit
105 Deposition condition determination unit
106 Injection execution unit

The invention claimed is:

1. A diesel particulate filter (DPF) regeneration control device for controlling execution of forced regeneration that removes particulate matter (PM) deposited on a DPF by increasing a temperature of the DPF in an exhaust gas treatment device of a diesel engine including a diesel oxidation catalyst (DOC) disposed in an exhaust passage and the DPF disposed downstream of the DOC, the DPF regeneration control device comprising:
   a processor configured to perform the operations of:
   a valve control unit for throttling a valve opening of at least one of an intake throttle valve or an exhaust throttle valve so that an upstream temperature of the DOC reaches a predetermined temperature; and
   a deposition condition determination unit for determining whether a deposition condition that a soluble organic fraction (SOF) deposition amount on the DOC exceeds a predetermined deposition amount is satisfied,
   wherein the valve control unit includes a throttle amount decrease control execution unit for executing throttle amount decrease control to increase the valve opening by decreasing a throttle amount of the valve opening when the deposition condition is satisfied to be smaller than when the deposition condition is not satisfied.

2. The DPF regeneration control device according to claim 1,
   wherein the valve control unit further includes:
   a stop determination unit for determining whether a throttle amount decrease stop condition is satisfied after execution of the throttle amount decrease control; and
   a throttle amount decrease control stop unit for stopping the throttle amount decrease control when the throttle amount decrease stop condition is satisfied.

3. The DPF regeneration control device according to claim 2,
   wherein the throttle amount decrease stop condition includes at least one of:
   a first throttle amount decrease stop condition that a temperature difference between an upstream temperature and a downstream temperature of the DOC is equal to or lower than a predetermined temperature;
   a second throttle amount decrease stop condition that a change rate of a temperature difference between an upstream temperature and a downstream temperature of the DOC is equal to or less than a predetermined rate; or
   a third throttle amount decrease stop condition that a heating amount in the DOC is equal to or less than a predetermined heating amount.

4. The DPF regeneration control device according to claim 1,
   wherein the deposition condition determination unit is configured to determine whether the deposition condition is satisfied, based on a SOF deposition index obtained by multiplying a weighting coefficient set according to the upstream temperature of the DOC by an operating time of the diesel engine.

5. The DPF regeneration control device according to claim 4,
   wherein, with a reference temperature on an upstream side of the DOC as a boundary, the weighting coefficient includes a negative weighting coefficient when the upstream temperature is higher than the reference temperature, and the weighting coefficient includes a positive weighting coefficient when the upstream temperature is lower than the reference temperature.

6. The DPF regeneration control device according to claim 1,
   wherein the valve control unit is configured to control the valve opening so that a throttle amount decrease amount increases as the SOF deposition amount on the DOC increases.

7. A diesel particulate filter (DPF) regeneration control method for controlling execution of forced regeneration that removes particulate matter (PM) deposited on a DPF by increasing a temperature of the DPF in an exhaust gas treatment device of a diesel engine including a diesel oxidation catalyst (DOC) disposed in an exhaust passage and the DPF disposed downstream of the DOC, the DPF regeneration control method comprising:
   a valve control step of throttling a valve opening of at least one of an intake throttle valve or an exhaust throttle valve so that an upstream temperature of the DOC reaches a predetermined temperature; and
   a deposition condition determination step of determining whether a deposition condition that a soluble organic fraction (SOF) deposition amount on the DOC exceeds a predetermined deposition amount is satisfied,
   wherein the valve control step includes a throttle amount decrease control execution step of executing throttle amount decrease control to increase the valve opening by decreasing a throttle amount of the valve opening when the deposition condition is satisfied to be smaller than when the deposition condition is not satisfied.

* * * * *